United States Patent
Kobayashi

(10) Patent No.: US 7,232,129 B2
(45) Date of Patent: Jun. 19, 2007

(54) SEALING APPARATUS WITH ENCODER

(75) Inventor: Naoto Kobayashi, Fukushima (JP)

(73) Assignee: NOK Corporation, Tokyo (JP)

( * ) Notice: Subject to any disclaimer, the term of this patent is extended or adjusted under 35 U.S.C. 154(b) by 340 days.

(21) Appl. No.: 10/961,049

(22) Filed: Oct. 12, 2004

(65) Prior Publication Data
US 2006/0076737 A1    Apr. 13, 2006

(51) Int. Cl.
*F16J 15/02* (2006.01)
(52) U.S. Cl. .................... 277/317; 277/551; 277/572
(58) Field of Classification Search ............. 277/317, 277/549, 551, 572; 324/174
See application file for complete search history.

(56) References Cited
U.S. PATENT DOCUMENTS

| | | | |
|---|---|---|---|
| 5,575,568 A * | 11/1996 | Rigaux et al. | 384/448 |
| 5,969,518 A * | 10/1999 | Merklein et al. | 324/173 |
| 6,776,420 B2 * | 8/2004 | Vignotto et al. | 277/572 |
| 6,994,472 B2 * | 2/2006 | Inoue | 384/448 |

FOREIGN PATENT DOCUMENTS

| | | |
|---|---|---|
| JP | 11-303879 | 11/1999 |
| JP | 2002-333033 | 11/2002 |
| JP | 2005069467 A * | 3/2005 |

* cited by examiner

*Primary Examiner*—Vishal Patel
(74) *Attorney, Agent, or Firm*—Jacobson Holman PLLC

(57) ABSTRACT

To prevent lowering and unstableness of magnetic force and trouble caused by influence of muddy water or the like entered between the magnetic encoder (21) and a magnetic sensor (6), a sealing apparatus (4) comprises an approximately C-shaped protecting annular member (11) fitted to one of an inner member (1) and an outer member (2), a first encoder member (12) having a cylinder portion (12*a*) fitted to the protecting annular member (11), a second encoder member (13) held between the protecting annular member (11) and the first encoder member (12), a seal annular member (14), and a seal member (15) which is vulcanized and bonded to the seal annular member (14) and has seal lips slidably contacting with the protecting annular member (11) and the encoder member (12).

1 Claim, 3 Drawing Sheets

Prior Art

SEALING APPARATUS WITH ENCODER

BACKGROUND OF THE INVENTION

1. Field of the Invention

The present invention relates to a structure of a sealing apparatus for closely sealing an annular space formed between an inner member and an outer member which are relatively rotated to each other. More particularly, the present invention relates to a sealing apparatus having a rotation detecting apparatus for detecting a rotational speed of front and rear wheels in an anti lock brake system of a motor vehicle. The sealing apparatus in accordance with the present invention is employed also in a field of an electrical appliance, an industrial machine, a bicycle or the like.

2. Description of Background Art

In conventional, as shown in FIG. 3, there has been developed a sealing apparatus 105 for closely sealing an annular space between an inner member 101 and an outer member 102 which are relatively rotated to each other via a rolling element 103, in which a magnetic encoder 106 is integrally formed with the sealing apparatus 105. The sealing apparatus 105 is structured such that first and second seal annular members 107 and 108 each formed in an L-shaped cross section are respectively fitted to the inner member 101 and the outer member 102, and a seal lip 109 is provided in the second seal annular member 108, and the seal lip 109 is brought into slidable contact with the first seal annular member 107. The magnetic encoder 106 is formed by an encoder member 111 made of a rubber elastic body such as a rubber or a resin in which a magnetic material powder is mixed, and is vulcanized and bonded to an outer side in an axial direction (a rightward direction in the drawing) of the first seal annular member 107. The encoder member 111 is structured such that magnetic poles are alternately formed in a circumferential direction, and is detected by a magnetic sensor 110 which is arranged close thereto.

However, in the structure mentioned above, since the magnetic encoder 106 and the magnetic sensor 110 are arranged at a position exposed to an atmospheric air in an outermost side in an axial direction, the magnetic encoder 106 and the magnetic sensor 110 are under a severe condition directly exposed to a spattering muddy water or foreign matter. If the muddy water makes an intrusion thereinto, rust generation is caused, thereby lowering a performance of detecting the rotational speed. Further, if the foreign matter makes an intrusion thereinto so as to be attached to a portion between the magnetic encoder and the magnetic sensor, there is a risk that the magnetic encoder or the magnetic sensor are damaged due to rotational jamming of the foreign matter in the worst case so as to lead the detected rotational speed into error. As a countermeasure thereof, in Japanese Unexamined Patent Publication Nos. 11-303879 and 2002-333033, there has been proposed a structure in which a magnetic encoder is wrapped by a protection plate arranged in an outer side in an axial direction of the magnetic encoder, and the protection plate integrally formed with the magnetic encoder is assembled in an inner member. However, in this structure, the muddy water or the foreign matter making an intrusion can not be sufficiently excluded, and there is a problem that the magnetic encoder is exposed to an abnormal compression or deformation at a time when the protection plate integrally formed with the magnetic encoder is assembled, whereby a detecting accuracy is deteriorated. Further, since the protection plate and the magnetic encoder are fitted and thereafter fitted to the inner member, the fitting force is weakened. Further, since end portions of the protection plate and the first seal annular member are exposed to the rolling element side, there is a risk that a grease within a bearing portion makes an intrusion from a portion between both the rings.

SUMMARY OF THE INVENTION

The present invention is made by taking the points mentioned above into consideration, and an object of the present invention is to provide a sealing apparatus integrally formed with a magnetic encoder, which prevents a magnetic force from being lowered or getting out of order caused by an influence of a muddy water, a foreign matter, an external magnetic field or the like making an intrusion into a portion between the magnetic encoder and a magnetic sensor, thereby to make the supply of magnetic force stable. In conjunction therewith, another object of the present invention is to prevent a damage caused by the muddy water or the foreign matter attached to the magnetic encoder or the magnetic sensor so as to prevent a service life of the sealing apparatus from being lowered.

In order to achieve the object mentioned above, in accordance with a first aspect of the present invention, there is provided a sealing apparatus for sealing an annular space formed between an inner member and an outer member which are relatively rotated to each other, wherein the sealing apparatus comprises:

a protecting annular member in which one approximately C-shaped end is fitted to one of the inner member and the outer member;

a first encoder member in which a cylinder portion is fitted to another approximately C-shaped end of the protecting annular member;

a second encoder member held in an inner side in an axial direction of the protecting annular member and between the first encoder member and the protecting annular member;

a seal annular member having a flange portion mounted to another of the inner member and the outer member so as to oppose to the protecting annular member; and a seal member which is vulcanized and bonded to the seal annular member and has seal lips brought into slidable contact with the protecting annular member and with the first encoder member, and wherein a magnetic sensor is arranged close to an outer side in an axial direction of the protecting annular member.

The present invention achieves the following effects.

In the sealing apparatus in accordance with the present invention provided with the structure mentioned above, since the protecting annular member covers the magnetic encoder in the approximately C-shaped manner, the sealing apparatus is not affected by the muddy water, the foreign matter or the like. Further, a relative position in the axial direction can be defined by aligning the respective outer peripheral side end portions of the protecting annular member and the first encoder member with each other, whereby it is possible to assemble without applying any abnormal compression or deformation to the second encoder member. As a result, it is possible to make the supply of magnetic force stable, and it is possible to improve a detecting accuracy for the rotational speed or the like.

Further, since the first encoder member is fitted to the protecting annular member in one end in the outer peripheral side, the end portion is not exposed to the rolling element side, and only the protecting annular member is fitted to the inner member, it is possible to improve the fitting force between the inner member and the protecting annular member, and it is possible to effectively prevent the grease within the bearing portion from making an intrusion thereinto.

Further, since the seal lip can be slidable with the first encoder member and the inner peripheral portion of the protecting annular member, and a labyrinth structure can be set between the protecting annular member and the seal member, it is possible to tremendously improve the exclusion of the muddy water, the foreign matter or the like. Further, since the first encoder member is fitted only to the protecting annular member, it is possible to improve the fitting force between both the members, whereby it is also possible to improve a sealing property with respect to the muddy water, the foreign matter or the like. Accordingly, it is possible to prevent the damage caused by the attachment of the muddy water or the foreign matter so as to prevent the service life of the sealing apparatus from being lowered.

Further, since the second encoder member can be formed to be the largest diameter by setting the labyrinth seal structure between the protecting annular member and the seal member, a detecting range of the magnetic force can be enlarged, whereby it is also possible to improve detecting accuracy.

DESCRIPTION OF THE PREFERRED EMBODIMENT

Next, a description will be given of an embodiment in accordance with the present invention with reference to the accompanying drawings.

Figure 1:
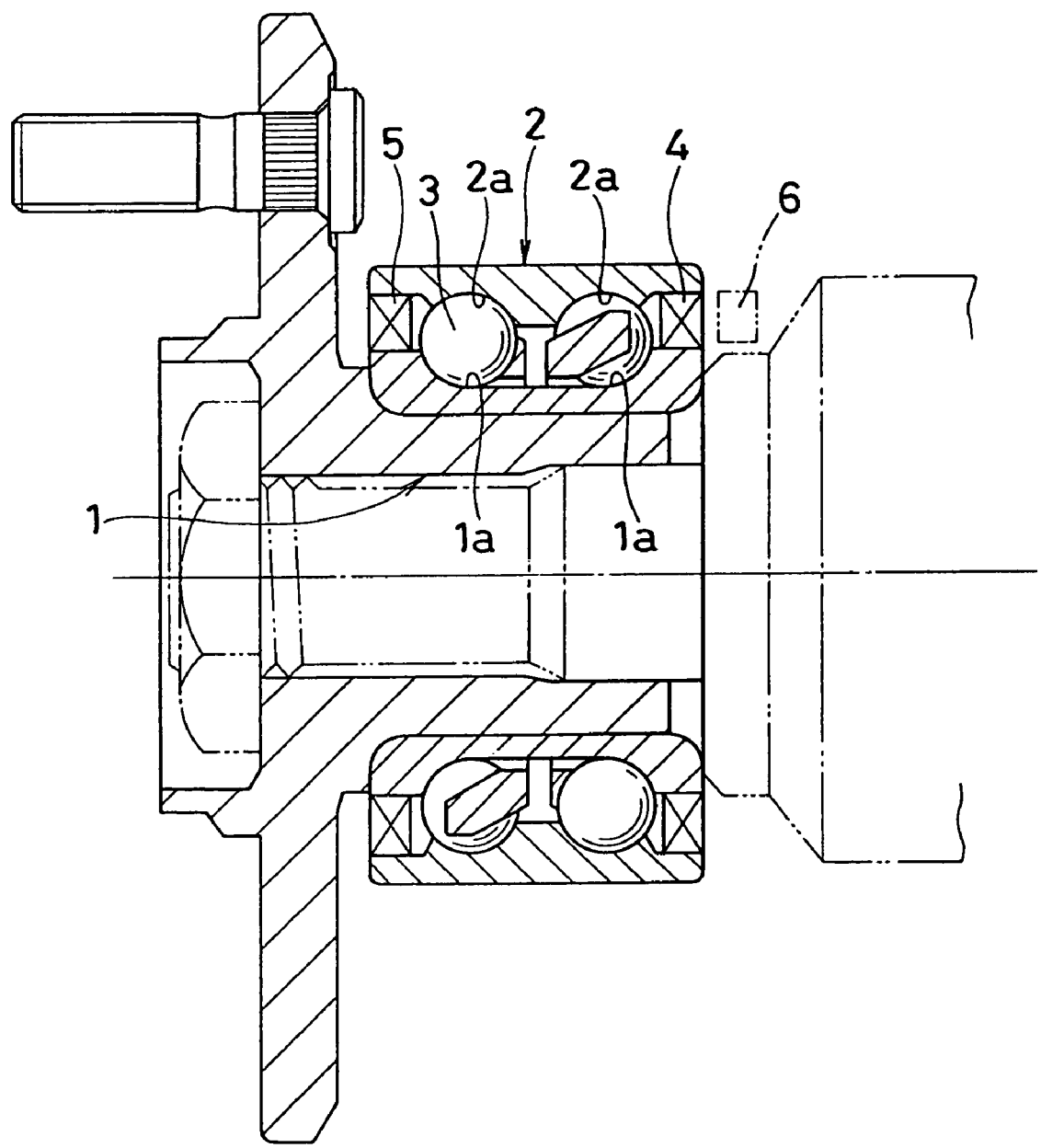
FIG. 1 is a cross sectional view of a main portion of a wheel supporting apparatus in which a sealing apparatus in accordance with an embodiment of the present invention is placed.

As shown in FIG. 1, sealing apparatuses 4 and 5 are mounted to both ends so as to closely seal an annular space formed by an inner member 1 and an outer member 2 which are relatively rotated to each other via a rolling element 3. The sealing apparatus 4 in one end is provided with a magnetic encoder for measuring a rotational speed. The inner member 1 and the outer member 2 have raceway surfaces 1$a$ and 2$a$ for the rolling element 3, and each of the raceway surfaces 1$a$ and 2$a$ is formed in a groove shape. The inner member 1 and the outer member 2 may be a bearing inner ring and a bearing outer ring independently, or may be assembled members of the bearing inner ring and the bearing outer ring combined with the other parts respectively. Further, the inner member 1 may be a shaft.

Figure 2:
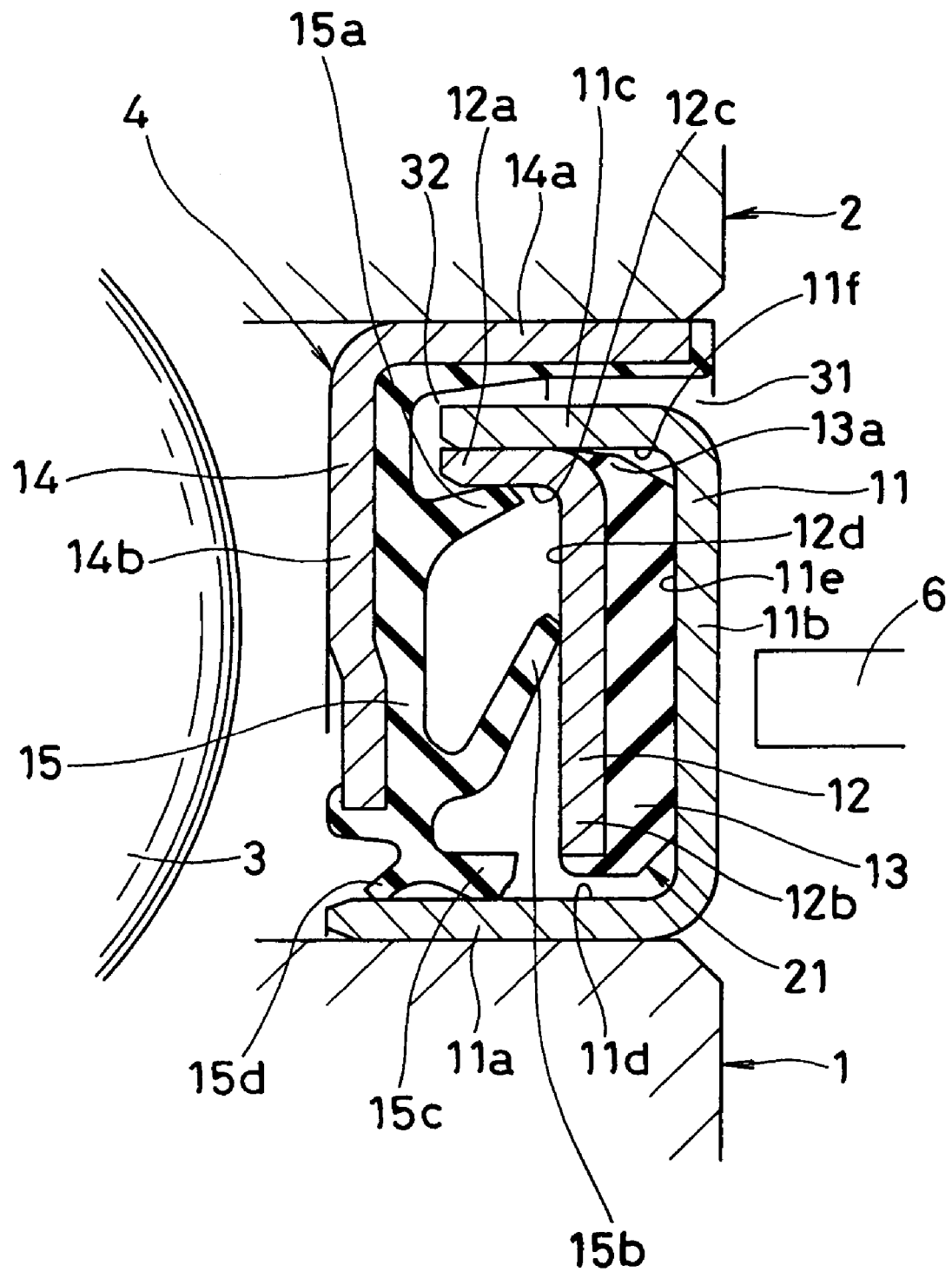
FIG. 2 is a partly cross sectional view of the sealing apparatus in FIG. 1.
Figure 3:
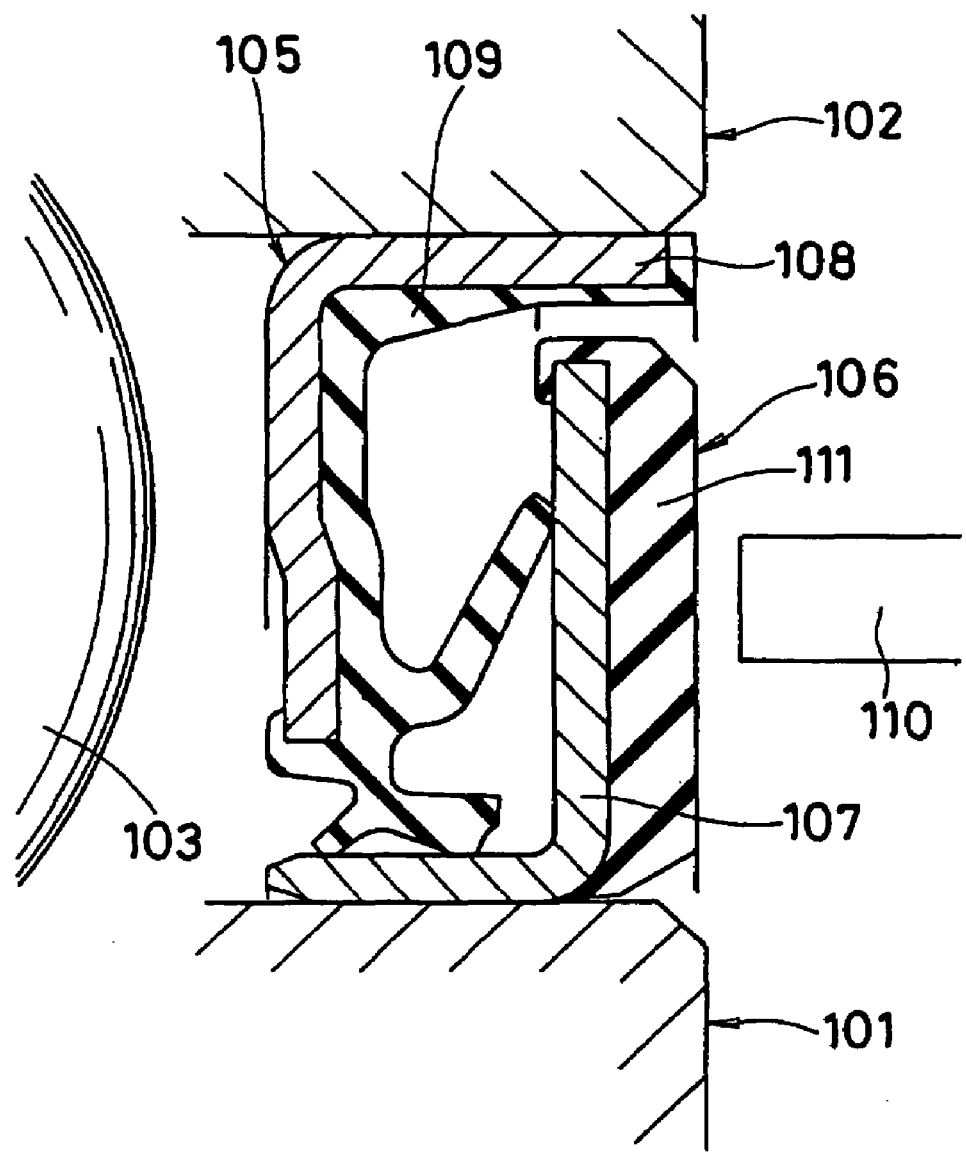
FIG. 3 is a partly cross sectional view of a sealing apparatus in accordance with a conventional embodiment.

FIG. 2 shows the sealing apparatus 4 with a magnetic encoder 21 in an enlarged manner. The sealing apparatus 4 is provided with a protecting annular member 11 in which one end is fitted to the inner member 1, a first encoder member 12 fitted to another end of the protecting annular member 11, a second encoder member 13 mounted to an inner side in an axial direction of the protecting annular member 11 and an outer side in an axial direction of the first encoder member 12, a seal annular member 14 fitted to the outer member 2, and a seal member 15 integrally formed with the seal annular member 14.

The protecting annular member 11 is formed in an approximately C-shape so as to surround the magnetic encoder 21, one approximately C-shaped inner peripheral side end 11$a$ is fitted to the inner member 1, and a cylinder member 12$a$ of the first encoder member 12 is fitted to an inner peripheral surface 11$f$ of another approximately C-shaped outer peripheral side end 11$c$. The protecting annular member 11 is formed by a nonmagnetic material so that a magnetic field generated by the internally enveloped magnetic encoder 21 can be transmitted to the magnetic sensor 6 in a most efficient manner.

The magnetic encoder 21 is formed by the first encoder member 12 and the second encoder member 13. The first encoder member 12 is formed in an L-shape in a cross section with a cylinder portion 12$a$ and a flange portion 12$b$, and is formed by a magnetic material. The second encoder member 13 is formed by vulcanizing a material obtained by adding any single magnetic material such as a ferrite magnetic particle, a rare earth magnetic particle, an alconi magnetic particle and the like or any mixture thereof to a rubber material, and thereafter magnetizing the material. The second encoder member 13 is vulcanized and bonded to the flange portion 12$b$ in an outer side in an axial direction of the first encoder member 12, and is brought into close contact with an inner side 11$e$ in an axial direction of the flange portion 11$b$ of the protecting annular member 11. In this case, the second encoder member 13 may be held between the first encoder member 12 and the protecting annular member 11 without being vulcanized and bonded to the first encoder member 12, or the second encoder member 13 may be previously vulcanized. In such the case, it is preferable that an outer peripheral portion 13$a$ of the second encoder member 13 is fitted to an inner peripheral surface 11$f$ of the outer peripheral side cylinder portion 11$c$ of the protecting annular member so as to be positioned.

Since relative positions in an axial direction of the first encoder member 12 and the protecting annular member 11 can be defined, by aligning the end portion of the outer peripheral cylinder portion 12$a$ of the first encoder member 12 with the end portion of the outer peripheral side cylinder portion 11$c$ of the protecting annular member 11, the first encoder member 12 can be assembled without applying any abnormal compression and deformation to the second encoder member 13.

The seal annular member 14 is formed in an L-shape having a cylinder portion 14$a$ and a flange portion 14$b$, and is mounted so as to oppose to the protecting annular member 11, and the cylinder portion 14$a$ is fitted to the outer member 2. A seal member 15 formed by a rubber elastic material is vulcanized and bonded to an inner peripheral portion of the seal annular member 14.

The seal member 15 integrally has a seal lip 15$a$ which is brought into slidable contact with the inner peripheral surface 12$c$ of the cylinder portion 12$a$ of the first encoder member 12, a seal lip 15$b$ which is brought into slidable contact with the axial inner side 12$d$ of the flange portion 12$b$ of the first encoder member 12, and seal lips 15$c$ and 15$d$ which are brought into slidable contact with the outer peripheral surface 11$d$ of one end 11$a$ of the protecting annular member 11.

Further, since gaps between the protecting annular member 11 and the seal member 15 are arranged close to each other in order to improve a sealing force, a labyrinth seal structure 31 and 32 is formed.

In this case, a material forming the second encoder member 13 may be synthetic resin such as a plastic or the like other than the rubber elastic material.

Further, a shape, a direction, a number and the like of the lips which are brought into slidable contact with the protecting annular member 11 and the first encoder member 12 are appropriately selected in accordance with a use condition, taking the sealing performance into consideration.

In accordance with the sealing apparatus having the structure mentioned above, since the protecting annular member 11 is formed in the approximately C-shape, the magnetic encoder 21 is not affected by the muddy water, the foreign matter or the like, the relative positions in the axial direction of both the members can be defined by aligning the respective outer peripheral side end portions of the protecting annular member 11 and the first encoder member 12, and it is possible to assemble without applying any abnormal compression or deformation to the second encoder member 13. As a result, it is possible to make the supply of the magnetic force stable, and it is possible to improve the detecting accuracy for the rotational speed or the like.

Further, the protecting annular member 11 is formed in the approximately C-shape, the labyrinth seal structures 31 and 32 can be set between the protecting annular member 11 and the seal member 15, and the seal lips are brought into slidable contact with the inner peripheral portions 12c and 12d of the first encoder member 12 and the outer peripheral surface 11d of the protecting annular member 11, it is possible to restrict the further intrusion of the muddy water, the foreign matter or the like to a minimum level, on the basis of the labyrinth seal structures 31 and 32 whereby it is possible to tremendously improve the exclusion of the muddy water, the foreign matter or the like.

Further, since the first encoder member 12 is fitted to the inner periphery of the outer peripheral side cylinder portion 11c of the protecting annular member 11, the end portions of both the members 11 and 12 are not exposed to the side of the rolling element 3. Further, since only the protecting annular member 11 is assembled on the inner member 1, the fitting force can be improved in comparison with the case that the structure obtained by fitting the protecting annular member 11 to the first encoder member 12 is fitted to the inner member 1, whereby a degree of close contact is increased, and it is possible to obtain a sufficient sealing performance against the intrusion of the grease within the bearing portion. Similarly to the above, since the first encoder member 12 is fitted only to the outer peripheral side cylinder portion 11c of the protecting annular member 11, it is possible to improve the fitting force, and it is possible to obtain a sufficient sealing performance with respect to the muddy water or the foreign matter between both the members 11 and 12.

Further, since the second encoder member 13 can be formed to the maximum diameter by setting the labyrinth seal structures 31 and 32 between the protecting annular member 11 and the seal member 15, it is possible to increase a detecting range for the magnetic force so as to improve a detecting accuracy.

What is claimed is:

1. A sealing apparatus for sealing an annular space formed between an inner member and an outer member which are relatively rotated to each other, wherein said sealing apparatus comprises:
   a protecting annular member having a C-shape, wherein one end of capable of being fitted to one of said inner member and said outer member;
   a first encoder member having a cylinder portion fitted to another end of said protecting annular member;
   a second encoder member held in an inner side in an axial direction of said protecting annular member and between said first encoder member and said protecting annular member;
   a seal annular member having a flange portion mounted to another of said inner member and said outer member so as to oppose to said protecting annular member; and
   a seal member which is vulcanized and bonded to said seal annular member and has seal lips brought into slidable contact with said protecting annular member and with said first encoder member, and
   wherein a magnetic sensor is arranged close to an outer side in an axial direction of said protecting annular member.

* * * * *